United States Patent Office 3,454,999
Patented July 15, 1969

3,454,999
CAPACITOR
Shiniti Koyanagi and Sumio Morikawa, Tokyo, Japan, assignors to Nippon Electric Company, Limited, Tokyo, Japan, a corporation of Japan
Filed May 12, 1966, Ser. No. 549,663
Claims priority, application Japan, May 17, 1965, 40/28,954
Int. Cl. H01g *13/00*
U.S. Cl. 29—25.42    2 Claims

ABSTRACT OF THE DISCLOSURE

A rolled capacitor is formed by masking the margins of a micron-thin film of polyethylene, etching the film with acid, and activating the unmasked portions. After removal of the maskings, the film is dipped in a metal salt plating solution which is subsequently reduced in resistivity by metal electroplating. The strip is then rolled with a superposed dielectric and a conductive paint coated at the ends. Molten metal is then spread on the paint to form layers for soldering lead wires.

---

This invention relates to a capacitor for use in electric circuits and in particular to a capacitor of the rolled metallized film type.

In rolled capacitors, the capacitor element is generally formed by either rolling up metal foils (such as tin) with dielectric films interposed, or by rolling up dielectric films onto which zinc or another metal has deposited. Examples of preferred dielectric films are polystyrene, polyester, polyethylene terephthalate, polycarbonate, and the like because of their excellent electric characteristics. While it is possible by vacuum evaporation to achieve a metal electrode as thin as several thousand angstroms and thus minify the capacitor and in addition give it self-healing properties, it is difficult to thin the dielectric film beyond a certain limit. This is because the radiant heat from the evaporation source reduces the mechanical strength of the film and the collision of the evaporated metal particles against the film produces pinholes, wrinkles, undulations, and other defects. A polycarbonate film, for example, for use in the vacuum-evaporation process must not be thinner than 4 microns and 6 microns for respectively laboratory and mass production techniques. It is possible, however, to manufacture a polycarbonate film of only 2 microns in thickness for other purposes. Likewise, a polyethylene terephthalate film must at least be 3.5–3.8 microns and 6 microns thick for vacuum evaporation in the laboratory and the factory, respectively, where film as thin as 3-microns is available.

At this juncture, it bears mentioning that the thinnest possible dielectric film is desirable because, for a given dielectric constant, a thinner dielectric film effects a reduction in the volume of the capacitor as is clear from the equation:

$$V/C = \alpha + 1.13 \times 10^7 \times d(d \times t)/\epsilon$$

where $V/C$ is the volume of a capacitor per unit of electrostatic capacity in cm.$^3/\mu f$; $d$ is the thickness of the dielectric film in microns; $t$ is the thickness of the electrode layer in microns; $\epsilon$ is the dielectric constant of the film; and $\alpha$ is a factor indispensable in the construction of a capacitor, and accounts for, among other things, the casing and the seal.

Accordingly, it is the object of this invention to provide a capacitor minified by the use of an extremely thin metallized film.

Briefly, the invention is predicated upon a novel metallized film which is manufactured not by the conventional vacuum-evaporation process, but rather by chemically plating the electrode metal onto a dielectric film in a unique manner and selectively leaving margins. When such metallized films are rolled up in a non-inductive manner, the capacitor is completed by spraying molten metal on the end surfaces of the capacitor element and then soldering the lead wires to the sprayed metal terminals. The dielectric film for such a technique may be the thinnest one available, with the result that a marked volume reduction is achieved.

Metals employed in chemical plating are nickel, copper, silver, gold, lead, and others. Among them, nickel is the most preferable from the viewpoints of affinity to the dielectric film, electric conductivity of the plated layer, and economy. The practical plating solution, however, simultaneously deposits phosphorus in the reduction reaction and raises the resistance of the plated layer up to about 30 ohms/square which is higher than desirable. This disadvantage has now been removed by electroplating copper, silver, nickel, or the like onto a substrate of a preliminarily chemically plated nickel layer of excellent affinity. For a plastic film, pretreatment is important to give a hydrophilic nature to the film. The surface layer is removed by an etching process which is generally carried via the immersion of the film into a mixture of sulfuric, phosphoric, and hydrofluoric acids for several seconds. A hydrophilic surface of the film is activated in the known manner by causing the surface to adsorb stannous ions and then dipping the film into palladium chloride solution. It is to be noted here that the nature of the surface of the dielectric film at the margins affects the leakage current and loss in the resultant capacitor and that any formation of polar radicals during the hydrophilization process is not desirable at the marginal portions. It is therefore preferable to protect those portions of the surface of the dielectric film which will become the margins, by masking them at least during the hydrophilization.

The above mentioned and other features and objects of this invention and the manner of attaining them will become more apparent and the invention itself will best be understood by reference to the following description of an embodiment of the invention taken in conjunction with the accompanying drawings wherein.

Figure 1:
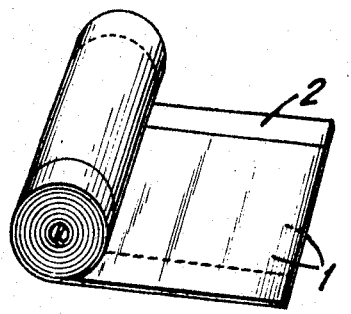
FIG. 1 is a perspective view of a metallized film according to the invention.

Turning now to the figures, and in particular to FIG. 1, initially a polyethylene terephthalate film of a thickness of about 4 microns is masked at the margins on both surfaces by roll-coating a toluene solution of water-soluble methylcellulose. The film is dried, and then dipped for several seconds at 60° C. into an etching solution consisting of 80 g. of phenol, 12 g. of water, and 150 g. of fuming sulfuric acid. The time duration of the etching treatment is short enough not to allow the margin coating to be dissolved. After being washed in water, the film is passed through a solution of stannous chloride and then a solution of palladium chloride in order to activate the unmasked portions. After being washed in cold water, the methylcellulose maskings are dissolved and removed. The activated film is now dipped for twenty or more seconds in a nickel plating solution such as "Sumer" containing a salt of nickel and maintained at 90° C. The duration determines the plating thickness; it being remembered that too thick a plating results in cracking over the plated surface. The marginal portions have no palladium cores and consequently nickel is not deposited thereon. The electric resistivity of the electrode portions obtained by chemically plating the film with nickel is 30 ohms/cm.² This resistivity is reduced to less than 0.5 ohm/cm.² when copper is electroplated for one minute onto the nickel plating.

Figure 3:
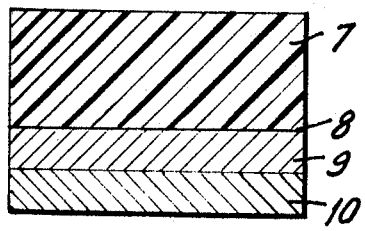
FIG. 3 is an enlarged sectional view of a portion of the metallized film of FIG. 1.

FIG. 3 shows a section of the thus-obtained metallized film in an exaggerated manner, with the plated metal shown for simplicity on only one surface of the dielectric film. In this figure the number 7 represents the polyethylene terephthalate film; 8 the palladium catalyst layer deposited on the film surface (symbolically); 9 the nickel layer formed by chemical plating; and 10 the copper layer formed by electroplating.

Figure 2:
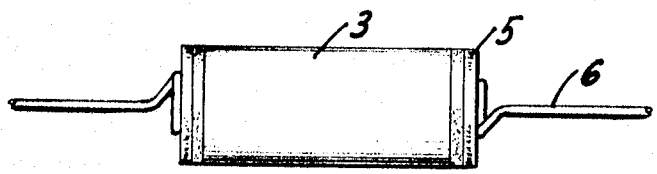
FIG. 2 is a side view of a capacitor comprising the metallized films of FIG. 1.

Subsequently, the metallized film is cut to the desired dimensions. In FIG. 1, which shows the cut and rolled metallized film, the electrodes 1 are shown on both sides of the dielectric 2. At the rear of the film, the electrode is staggered with relation to that of the front surface. As shown in FIG. 2, a non-inductive capacitor element 3 is formed by rolling up the metallized film of FIG. 1 in conjunction with a superposed non-metallized polyethylene terephthalate film. Conductive paint is coated at the ends of the capacitor, and molten metal is then sprayed on to form layers 5 for soldering lead wires 6. The capacitor is then completed with some suitable conventional protection being overlaid onto at least a portion of the capacitor element.

The metallized layer may also be formed on one side only of the dielectric film. In this case, the non-metallized film back would be placed adjacent the metal film of a second metallized film to form the second capacitor plate. Maskings may be provided, in addition to the foregoing method by mechanically attaching another film to the portion to be masked. Furthermore, instead of masking to prevent the chemical plating at the masked portion, the whole surface may be plated and then a portion removed by way of etching, for example, at the portion that will serve as the margin.

A capacitor formed in accordance with the above-explained embodiment is quite small because of the thinness of the dielectric film and metal electrode layer and satisfies the required ratings for the temperature coefficient of the electrostatic capacity, the loss factor, the service temperatures, and the like.

In the following table the volumes of 0.5 µf. capacitor elements are given for polycarbonate films of various thickness.

TABLE.—VOLUME OF CAPACITOR ELEMENTS FOR FILMS OF VARIOUS THICKNESS

| Thickness of film (µ) | Specific volume | Withstand voltage (v.) | Remarks |
|---|---|---|---|
| 6 | 9 | 170 | Vacuum evaporation. |
| 3.5 | 3.1 | 85 | Metallized according to the invention. |
| 2 | 1 | 40 | |

As shown in the table, it is possible with this invention to use a film of about 2 microns in thickness, much below that usable with the conventional vacuum evaporation method.

With a decrease in the thickness of the film, a decrease naturally appears in the withstand or breakdown voltage of the capacitor. In this connection, it should be pointed out that the withstand voltage of a conventionally metallized capacitor is not that required by the electrical network, but rather is that which inevitably results from the use of a thick plastic film in view of the yield during the vacuum evaporation process. In a transistorized circuit, a withstand voltage of about 40 v. is generally quite sufficient for a capacitor.

As has already been described, a decrease of the thickness of the plastic film considerably reduces the yield during the vacuum evaporation process and this, of course, raises the price of the metallized film. It has been found that with polyethylene terephthalate film of 4 microns in thickness, for example, the price of a .5 µf. capacitor made in accordance with the invention is only 60% of that made with the conventional vacuum evaporation process.

While the principles of the invention have been described in connection with specific apparatus, it is to be clearly understood that this description is made only by way of example and not as a limitation to the scope of the invention as set forth in the objects thereof and in the accompanying claims.

We claim:
1. The method of making a capacitor comprising the steps of:
   masking alternate margins of a micron-thin strip of dielectric films;
   etching said strip for a time duration less than that necessary to dissolve the margin masks;
   activating the unmasked strip portions;
   removing the margin masks;
   subjecting said film to a metal salt plating solution including a reducing agent;
   electroplating a metal on the metal layer formed by said chemical plating;
   rolling said metallized film with a superposed second dielectric film;
   end coating the said rolled ends of said film with a metal; and
   soldering lead wires on the respective ends of said roll.
2. The method claimed in claim 1, in which said step of activating said film comprises the step of passing said film through a solution of stannous chloride and a solution of palladium chloride.

References Cited

UNITED STATES PATENTS

| | | | |
|---|---|---|---|
| 3,142,581 | 7/1964 | Leland. | |
| 3,235,473 | 2/1966 | Le Duc | 204—30 |
| 3,274,663 | 9/1966 | Bonenfant et al. | 29—25.42 |
| 3,340,607 | 9/1967 | Shutt | 204—30 XR |

JOHN F. CAMPBELL, Primary Examiner

RICHARD B. LAZARUS, Assistant Examiner

U.S. Cl. X.R.

204—30